No. 856,597. PATENTED JUNE 11, 1907.
A. E. McCLAIN.
ART OF MAKING SALT.
APPLICATION FILED AUG. 22, 1906.
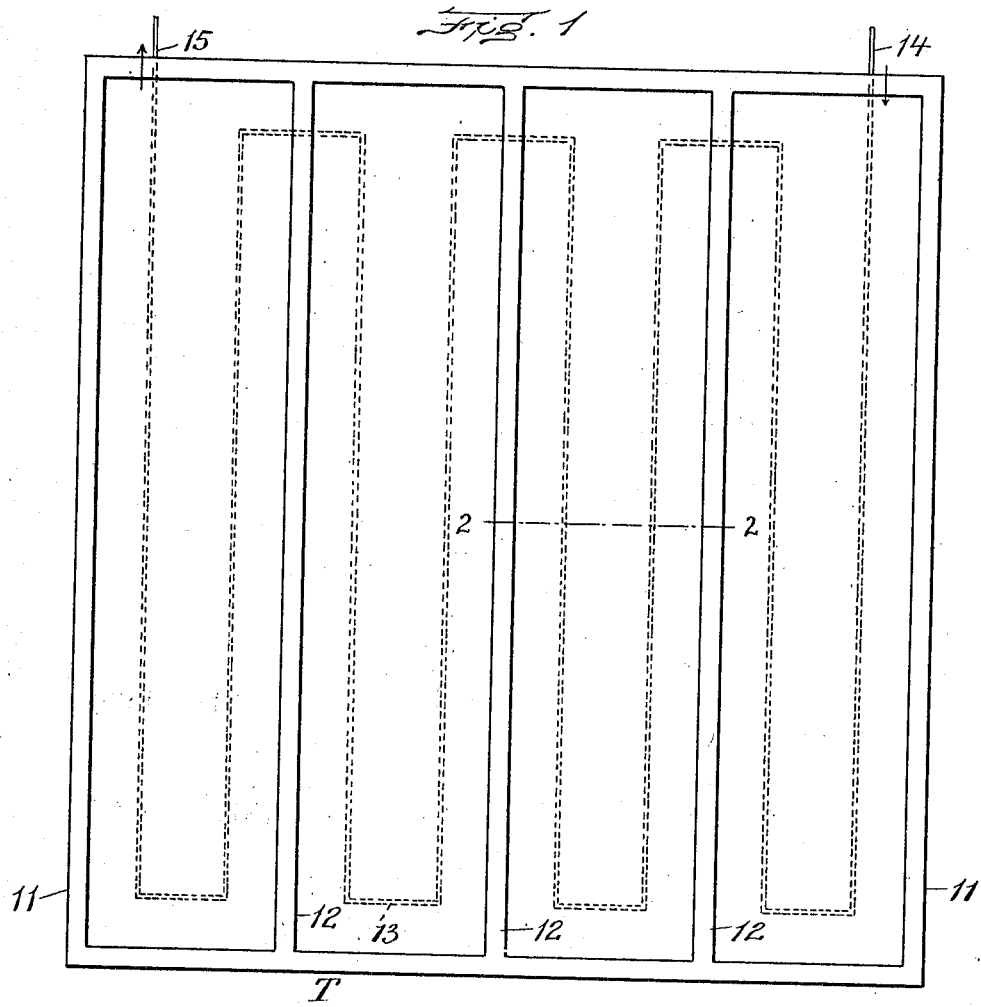
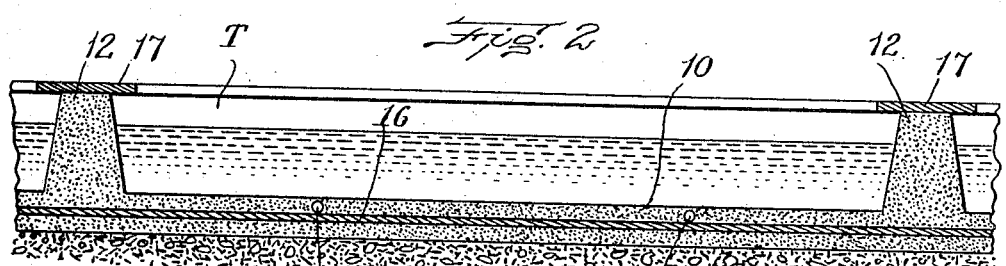

UNITED STATES PATENT OFFICE.

ANDREW E. McCLAIN, OF SYRACUSE, NEW YORK, ASSIGNOR OF FIVE-EIGHTHS TO T. M. DIX, OF CHELMSFORD, MASSACHUSETTS.

ART OF MAKING SALT.

No. 856,597.     Specification of Letters Patent.     Patented June 11, 1907.

Application filed August 22, 1906. Serial No. 331,583.

*To all whom it may concern:*

Be it known that I, ANDREW E. MCCLAIN, of Syracuse, in the county of Onondaga and State of New York, have invented certain new and useful Improvements in Art of Making Salt, of which the following is a specification.

My invention has reference to the production of salt by the evaporation of brine. This has heretofore been most successfully effected by exposing the brine in vats formed in the earth and in the open air to the action of the sun. The crystals thus formed are of a desirable size and solidity, but it is necessary to protect the vats by covers, which are difficult to handle, and in spite of these, soil and impurities conveyed by the wind get into the liquid and render the product dirty. Moreover the process is liable to be made slow by the dilution of the brine by rain and dew, and evaporation practically ceases at night and upon cloudy days. Salt has also been made by boiling the brine, but its elevation to this temperature results in the formation of small crystals, which, while clean, are of less commercial value than the coarser crystals produced by the open air process.

The chief object of the present invention is to manufacture by the application of artificial heat, salt which shall present all the desirable properties of both the above processes.

In the accompanying drawings, in which similar characters designate like parts in both views, Figure 1 is a top plan view of a tank constructed in accordance with my invention, and Fig. 2 is a partial transverse vertical section therethrough on the line 2—2 of Fig. 1.

The tank T is preferably located in some inclosing protecting structure, and may be conveniently constructed of such a plastic as cement. It comprises, as hereafter illustrated, an integral bottom wall 10, side walls 11 and partitions 12, these latter dividing the tank into a suitable number of sections. Embedded in the bottom of the tank are pipes or conduits 13 for conducting the heating fluid, which may consist of water, at the proper temperature, or electricity flowing through suitable conductors. The piping is shown as continuous, the supply entering at 14 and discharge occurring at 15. Included in the bottom wall, upon the opposite side of the piping from the interior of the tank, is a layer of insulating material 16, which may be of wood or any substance possessing the desired properties. Planks 17, or the like, may be placed along the tops of the partitions, they serving as walks to give the attendants ready access to all parts of the tank.

When the evaporating fluid is allowed to flow through the piping, its heat is distributed through the inclosing walls of the tank, so that the temperature will be practically uniform throughout the structure, wasteful downward conduction being prevented by the insulation 16. The covering of the pipes by the cement obviates the contact of the brine with them, preventing their corrosion and their becoming insulated by a deposit of crystals upon their surface. The temperature of the fluid is such that the heat applied to the brine will be less than boiling, it preferably approximating that imparted by the sun, or substantially 90 degrees Fahrenheit. The evaporation by my improved process may be made continuous and carried on economically under conditions of perfect cleanliness, and the product will be in large, firm crystals of a maximum value.

Having thus described my invention, I claim:

The process of making salt which consists in subjecting saturated brine in a protected tank to the continuously and uniformly applied evaporating action of artificial heat to maintain the brine at a temperature of approximately 90 degrees F, and removing the salt as required.

In testimony whereof I have affixed my signature, in presence of two witnesses.

ANDREW E. McCLAIN.

Witnesses:
   M. R. MILLER,
   M. DAUER.